United States Patent [19]

Crankshaw

[11] 4,064,979

[45] Dec. 27, 1977

[54] SYNCHRONIZING CLUTCH

[75] Inventor: John H. Crankshaw, Erie, Pa.

[73] Assignee: Dynetics, Inc., Erie, Pa.

[21] Appl. No.: 715,047

[22] Filed: Aug. 17, 1976

Related U.S. Application Data

[63] Continuation-in-part of Ser. No. 639,910, Dec. 11, 1975.

[51] Int. Cl.² ............................................. F16D 23/06
[52] U.S. Cl. .............................. 192/53 F; 192/85 AA
[58] Field of Search ............... 192/53 E, 53 F, 85 AA

[56] References Cited

U.S. PATENT DOCUMENTS

| | | | |
|---|---|---|---|
| 2,563,726 | 8/1951 | Kelbel | 192/53 F |
| 2,883,021 | 4/1959 | Hill | 192/53 E X |
| 3,071,224 | 1/1963 | Crankshaw | 192/53 F |
| 3,221,851 | 12/1965 | Vandervoort | 192/53 F |
| 3,739,890 | 6/1973 | Nolli | 192/53 E |

*Primary Examiner*—Allan D. Herrmann
*Attorney, Agent, or Firm*—Charles L. Lovercheck

[57] ABSTRACT

A synchronizing clutch made up of a quill shaft, a hub, a toothed sleeve for connecting the hub to the shaft and a clutch between the sleeve and the hub for synchronizing the speed of the hub with the speed of the sleeve prior to connecting the hub teeth to the shaft teeth. Drive pins are provided on the shaft for preventing the teeth from interfering at synchronization and an improved adjusting means and a retaining ring provide a space for the clutch discs so that the axial position of the clutch discs relative to the drive pins prior to synchronism is always precisely known.

19 Claims, 4 Drawing Figures

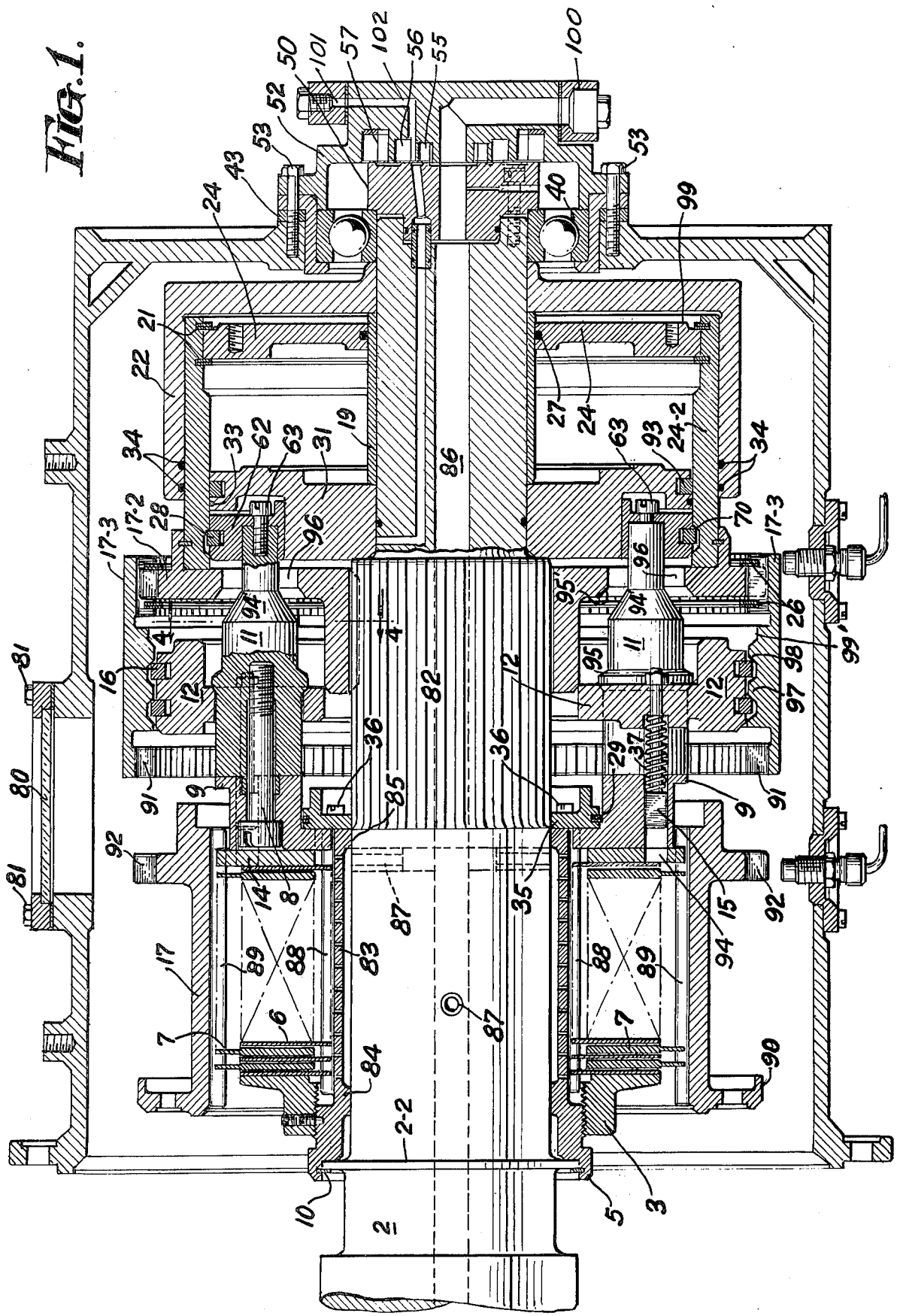

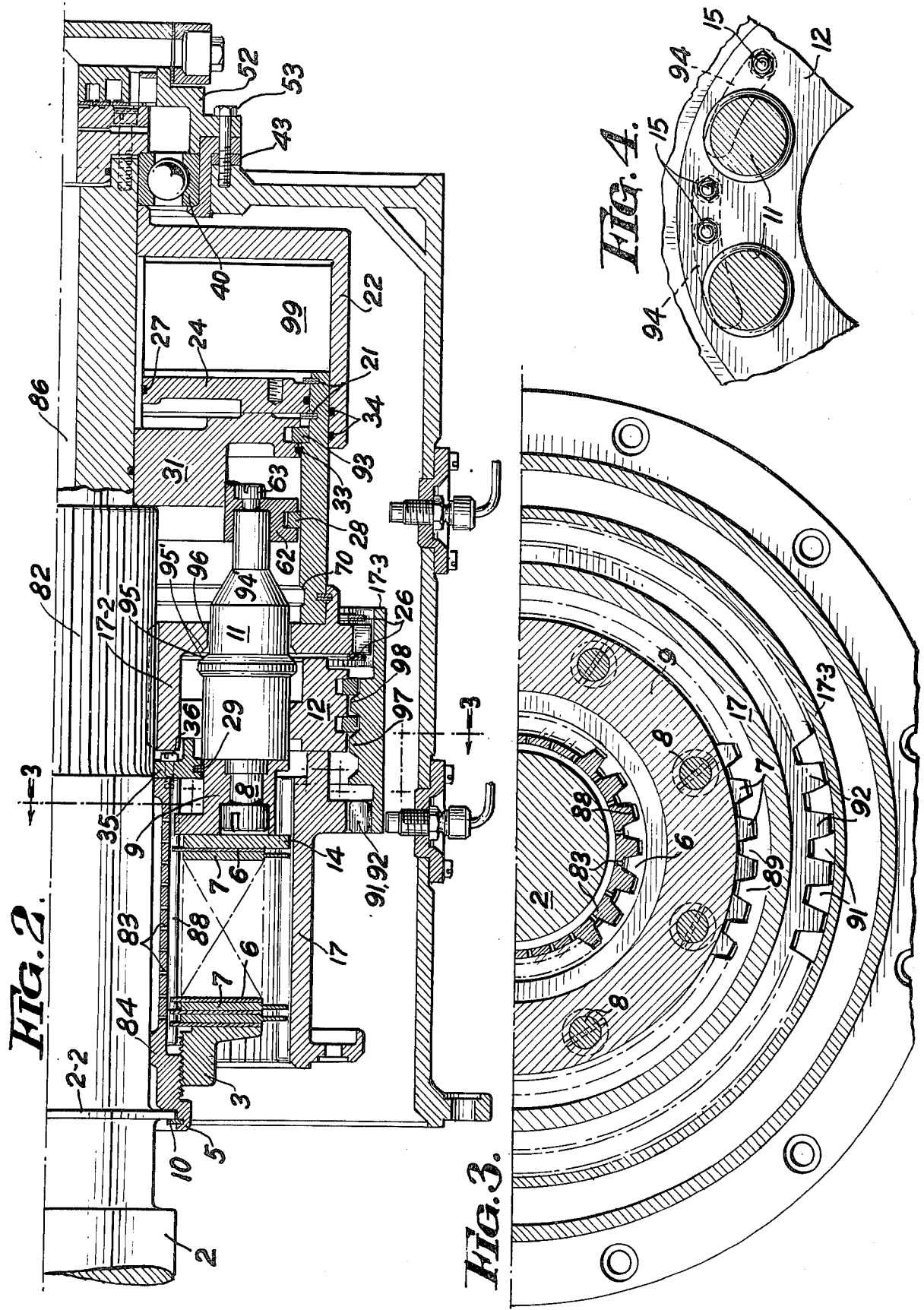

SYNCHRONIZING CLUTCH

REFERENCE TO COPENDING APPLICATION

This application is a continuation-in-part of patent application Ser. No. 639,910 filed Dec. 11, 1975 on a synchronizing coupling.

REFERENCE TO PRIOR ART

This application is an improvement over U.S. Patent No. 3,071,224 issued to John H. Crankshaw on Jan. 1, 1963.

OBJECTS OF THE INVENTION

It is an object of the invention to provide an improved synchronizing clutch.

Another object of the invention is to provide an improved synchronizing mechanism for a synchronizing clutch.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit of sacrificing any of the advantages of the invention.

GENERAL DESCRIPTION OF THE INVENTION

The combined diesel/gas turbine power plants for large Coast Guard cutters introduce a radical departure from past practice and a major step forward in the art of marine propulsion. The invention disclosed herein came about to solve problems which manifested themselves in connection with the above combined diesel/gas turbine drives. The major problems which manifested themselves in previous designs of synchronizing clutches used in such designs resulted in: (a) broken or damaged drive pins 14; (b) damaged seals 50, 55, 56, and 57; (c) air/oil intersystem leaks due to damaged o-rings, (d) difficulty of making clutch adjustments after servicing; and (e) refusal of the clutch to disengage because of coupling teeth. Several of these items are interrelated. For example, if disassembly of the clutch were not required for other reasons, seal and o-ring damage would not be as serious.

The previous designs were based on the assumption that each high speed pinion was to be provided with a spacer ring, individually ground, to establish a fixed axial dimension between the planes of the clutch case mounting flange and the shaft flange to which the clutch load end hub is bolted and that the maximum axial float of the high speed pinion due to thrust bearing clearance and gear train backlash was not to exceed a total of 0.090 inches.

Axial variations in build-up of tolerances in the quill shaft 2, clutch case and clutch assembly were to be corrected at assembly by grinding the split shim to such a thickness that the drive pins 14 would engage the lugs in the end of the load end hub to proper depth when the cam surfaces on the synchronizing pins and the power end hub parted company.

As a practical matter, this condition has seldom been met due to initial errors, subsequent mixup of parts, and the difficulty in making these shim adjustments. Consequently, drive pins reached the lugs either too early or too late which, in either case, can cause binding or breakage in scoring damage. The basic problem is that drive pin function is dependent on precise positioning of the load end hub and the sleeve at engagement.

It has been discovered that the entire problem can be circumvented by moving the drive pin function inward to the friction discs where axial position is always precisely known. This can be done by (1) backing off adjusting nut 3 to allow insertion of a new friction disc 14 having kidney-shaped holes as shown in FIG. 4, (2) providing axially-disposed holes in pressure ring 9 to accept the spring-loaded alignment pins 15 and modifying the alignment plate 12 to accept and support the alignment pins 15 and spring 37 as shown. The alignment pins and kidney holes perform their functions during engagement in exactly the same way as did the drive pins and load end hub lugs in the said application, their circumferential positions permitting alignment and engagement of the sleeve and load end hub teeth as before. However, since axial positioning of the parts is automatically accomplished by closing the disc pack and held by machined dimensions, no shim adjustment is required. The axial position of the load hub is then of no great consequence.

GENERAL DESCRIPTION OF THE DRAWINGS

FIG. 1 is a longitudinal, cross-sectional view of the clutch according to the invention shown in disengaged position.

FIG. 2 is a partial cross-sectional view similar to FIG. 1 showing the coupling in engaged position.

FIG. 3 is a cross-sectional view taken on lines 3—3 of FIG. 1.

FIG. 4 is an enlarged partial, cross-sectional view taken on line 4—4 of FIG. 1.

DETAILED DESCRIPTION OF THE DRAWINGS

Now, with more particular reference to the drawing, the clutch has a case 1 with an inspection plate 80 held in place by bolts 81. The ball bearing 40 is held in place in its seat by the end cap 52, held in place by bolts 53. The bearing 40 carries the load end of the quill shaft 2. The quill shaft extends out the open end of the clutch case 1 and may be attached to a prime mover such as a gas turbine. The quill shaft 2 has the annular cylinder 22 fixed to it and has the disc-like piston stop 31 fixed to it. The quill shaft 2 also has a splined section 82 on which the internally-splined hub sleeve part 17-2 is slidably supported. The quill shaft 2 also has a radially, outwardly-directed flange 2-2 adjacent the drive end of the clutch.

THE DISC CARRIER

The disc carrier is a hollow cylindrical member splined to shaft 2 and having the radially outwardly-directed openings 83 in it and inwardly-extending flanges 84 and 85 which rest on the cylindrical part of the quill shaft 2 adjacent the flange 2-2 and define a space for oil from bores 86 and 87. The quill shaft 2 has central bore 86 through which oil is directed to the radial opening 87 into the space below the openings 83 to lubricate the discs.

The outer periphery of the disc carrier 5 has axially extending splines 88 which are received in circumferentially-spaced teeth in the steel discs 6. An adjusting nut 3 is threadably supported on the threaded end of the disc carrier and a snap ring 10 is received in an internal groove in the disc carrier, holding the disc carrier rigidly to the flange 2—2. A retaining ring 35 is fixed to the right hand end of the dics carrier and held in rigid relation thereto by the cap screw 36. The outer periphery of the retaining ring 35 has a peripheral groove which receives the piston ring 29 that slidably engages the inner periphery of the pressure ring 9.

The load end hub 17 has internal splines 89 which are received in the circumferentially-spaced internal grooves in the friction discs 7. The adjusting nut 3 may have a set screw 4 by which the adjusting nut can be locked in position after final adjustment.

The load end hub 17 has an outwardly-directed flange 90 having axially spaced holes shown for connecting the load end hub to a load such as a propellor drive.

The sleeve 17-3 has internal gear teeth 91 which engage the external teeth 92 on the load end hub when the coupling is engaged.

Annular piston 24 is slidably supported on the inner spacer 19 which is supported on the quill shaft between the cylinder 22 and the piston stop 31 and the piston 24 has an internal groove with a sealing ring 27 therein.

The outer periphery of the piston 24 is received between the spaced retaining rings 21 which hold it in rigidly to the sleeve portion 24-2 of the piston. The piston stop 31 has a ring 93 in a groove in its outer periphery which makes sliding engagement with the inner periphery of piston-sleeve 24-2 and a sealing ring 33 provides an internal seal between the piston stop 31 and the inner periphery of piston sleeve 24-2. Sealing rings 34 are provided in internal grooves in the cylinder 22. The piston sleeve 24-2 has internal detent grooves which receive the detent ring 28 when the piston 24 is in the disengaged position shown in FIG. 1.

The pin support ring 62 has the external groove which receives ring 28 which moves with it, and is slidably received in sleeve 24-2. Ring 62 has circumferentially-spaced balking pins 11 which have their reduced size ends received in counter bores in pin support ring 62, held rigidly thereto by the screws 63. Pins 11 extend through holes in ring 17-2 and are slidably received in ring 12. The detent ring 28 is received in an external groove in the pin support rings 62 and can move inwardly and outwardly therein to allow it to slide in and out of the groove in the sleeve 24-2.

The alignment ring 12 has an internal surface that slides on the external cylindrical surface on the axially-extending flange on ring 17-2. The alignment ring has circumferentially disposed grooves which receive the detent rings 16, and detent rings 16 are received in the grooves on the internal surface of sleeve 17. The grooves in sleeve 17 have inclined sides, as shown, which act as cams.

The pressure ring 9 slidably receives the enlarged end of the drive pins 15 in the spaced holes therein which are urged toward the thick friction disc 14 by ring 12 through compression springs 37. The thick friction disc 14 has circumferentially spaced, kidney shaped hole 94 formed in it and these holes 94 receive the ends of some of the pins 15 which are aligned with these holes just prior to tooth engagement of the gear teeth. The pins 15 are urged toward the disc 14 by the compression springs 37.

The balking pins 11 have a frusto-conical surface 94 which is engaged by the cam surface 95 when ring 12 is initially rotated during the synchronizing.

THE BALKING MECHANISM

The force to engage the clutch is applied by engaging fluid (air, oil, or other suitable fluid) introduced through a suitable control circuit to fitting 101 which flows to piston 24 by passage 102, but the gears cannot engage until the drive has synchronized. Lub oil that is admitted to connection 100 to passage 86 also flows to the disc pack, through ports 87, viscous drag between discs, rotates ring 14 and pins 11 relative to hub 17-2. The sleeve 24-2 and coupling sleeve 17-3 are all fixed together and apply force to the pressure ring 9 through balking pins accelerating the load end hub 17. When the pins 11 and ring 62 are initially rotated slightly relative to the hub 17-2, the frusto-conical cam surfaces of pins 11 engage the hub 17-2 and the force of the piston 24 is transmitted through the pins 11 to ring 9 thereby effecting engagement of the clutch plates with each other.

The sleeve 17-3 carries detents 16 and the force of the piston 24 is initially transmitted from the sleeve 17-3 through ring 12 and pins 11 to the ring 9 and thence exerts a force on the disc 14.

To engage the clutch, with quill shaft 2 rotating, fluid under pressure is admitted to the groove 99 in the cylinder 22 behind piston 24. This fluid pressure forces the piston toward the left, carrying with it the pin support ring 62 and alignment plate 12. Pressure is applied to the pressure ring 9 by the ends of pins 11 and through pressure ring 9 to the thick disc 14 and thence to the discs 6 and 7, causing a frictional force to be exerted between them. The frictional force between discs 6 and 7 cause discs 6 to drag the discs 7 along with them, rotating the pressure ring 9 and with it, the pins 11, bringing the surface 94' into engagement with the cam surface 95', thereby stopping the movement of piston 24.

Releasing the clutch involves introducing fluid under pressure in the space between the piston 24 and the piston stop 31 thereby moving sleeve 17 toward the right and moving the teeth 91 out of engagement with the teeth 92.

It will be noted that the position of the friction disc 14 is determined by its contact with pressure ring 9. Therefore, the drive pins 15 will always be at a precise distance from the friction disc 14 prior to engagement. The action of the balking pins at engagement is similar to the corresponding parts in the parent application.

The detent rings 16 are received in grooves 97 and 98 in coupling sleeve 17-3 prior to engagement, but, when synchronism is reached, the detents will move over the detent grooves one stop to right to grooves 98 and 99, advancing the pins 15, due to the random position of the pins relative to the kidney-shaped holes, at least half of the pins will enter holes while the other half may be arrested by contact with the material between the holes.

At synchronism, the lateral component of force on the pins 11 is removed and the pins 11 slide into their openings in hub plate 17-2 releasing clutch plate pressure and allowing the coupling sleeve 17-3 to continue its travel toward the left, advancing the drive pins 15 that are aligned with the kidney-shaped holes 94, thus loosely connecting the drive and driven shafts and allowing the drive and driven shafts limited relative circumferential motion to bring the drive pins into contact with the sides of the kidney-shaped holes and allowing teeth 91 to freely slide into engagement with the teeth 92. The sleeve teeth are thus positioned to engage the hub teeth as the piston proceeds to the left.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A synchronizing clutch comprising,
   a first member including a first coupling teeth,
   a second member including a second coupling teeth adapted to be moved into engagement with said first coupling teeth,
   synchronizing means on said clutch for synchronizing said coupling teeth,
   said synchronizing means comprising a cylindrical disc carrier on said first member having an adjusting ring fixed to one end thereof and a retaining ring fixed to the other end defining a space,
   first discs supported on said disc carrier in said space,
   a pressure ring on said disc carrier adjacent said retaining ring,
   second discs connected to said second member and supported between said first discs,
   one of said second discs being relatively thick and having kidney-shaped holes therein and disposed in engagement said with said pressure ring,
   and drive pins extending through said pressure ring and adapted to engage said holes in said relatively thick disc when said first member and said second member are synchronized with each other,
   said pressure ring constituting a positive locating means for said relatively thick disc relative to said drive pins whereby the position of said pins relative to said relatively thick disc is determined.

2. The synchronizing clutch recited in claim 1 wherein said pressure ring is circumferentially restrained relative to said cylindrical disc carrier.

3. The synchronizing clutch recited in claim 1 wherein said adjusting ring is threadably attached to said disc carrier and rotatable to adjust the space between said adjusting ring and said pressure ring.

4. The synchronizing clutch recited in claim 1 wherein said adjusting ring is threadably adjustable to said disc carrier whereby said adjusting ring can be moved toward and away from said pressure ring for adjusting the space therebetween.

5. The synchronizing clutch recited in claim 4 wherein said pressure ring is a pressure plate and is supported adjacent said relatively thick disc, said drive pins extending through said pressure plate.

6. The clutch recited in claim 1 wherein said pressure ring is concentrically disposed on said disc carrier, disposed between said retaining ring and said thick disc and said ring extending radially outwardly from said retaining ring and said drive pins extending through axially disposed holes in said pressure ring.

7. The clutch recited in claim 6 wherein said sychronizing means further comprises axially-disposed blocking pins having a frusto-concial-shaped end,
   the end of said blocking pins remote from said frusto-conical end engaging said pressure ring and said frusto-conical end being fixed to a supporting ring, and detent means on said supporting ring cooperating with actuating means for moving said blocking pins toward said pressure ring.

8. The clutch recited in claim 7 wherein said drive pins are supported on an alignment ring.

9. The clutch recited in claim 8 wherein said drive pins are engaged by compression springs, said compression springs engaging said alignment ring and said drive pins are slidably supported on said alignment ring whereby said drive pins compress said compression springs and slide on said alignment ring when said alignment ring is moved toward said pressure ring by actuating means on said clutch.

10. The clutch recited in claim 9 wherein said blocking pins are disposed adjacent a ring having cam means thereon, said blocking pins being rotated with said pressure ring relative to said cam means whereby said cam means forces said balking pins toward said pressure ring exerting a pressure thereon.

11. The clutch recited in claim 10 wherein said alignment ring has detent means on the outer periphery thereof and said actuating means comprising an annular cylinder supporting second gear teeth thereon and detent means disposed on an annular cylinder engaging said support ring whereby said blocking pins are initially urged into engagement with said pressure ring at the beginning of an engagement cycle.

12. The clutch recited in claim 1 wherein said first member comprises a quill shaft and said second member comprises a load end hub.

13. The clutch recited in claim 12 wherein said load end hub has coupling teeth supported on the outer periphery thereof,
   said coupling teeth engaging the teeth on the inner periphery of said second coupling.

14. The clutch recited in claim 2 wherein said first discs have notches on their inner periphery and said notches are slidably supported on teeth on the outer periphery of said cylindrical disc carrier.

15. The clutch recited in claim 2 wherein said retaining ring is an annular member fixed to the end of said disc carrier remote from said adjusting ring by means of threaded bolts.

16. The clutch recited in claim 15 wherein said pressure ring is L-shaped in cross section and extends radially outwardly from said retaining ring, said pressure ring having teeth on the inner periphery thereof engaging teeth on said cylindrical disc carrier.

17. The clutch recited in claim 16 wherein said pressure ring has circumferentially-spaced, axially-extending holes and said drive pins extend through said holes.

18. The clutch recited in claim 17 wherein said drive pins are slidably supported on an alignment ring, means provided on said alignment ring for actuating said alignment ring, moving said alignment ring toward said pressure ring.

19. A synchronizing clutch comprising,
   a drive shaft,
   a load end hub having a hub thereon,
   first clutch plate means, and
   synchronizing means,
   said synchronizing means being adapted to connect said drive shaft to said driven member,
   second clutch plates including a relatively thick clutch plate,
   a pressure ring engaging said thick clutch plate and positioning said clutch plate relative to said drive pins, and means fixing said pressure ring to said disc carrier,
   said synchronizing means comprising drive pins on said pressure ring adapted to loosely engage holes in said relatively thick clutch plate.
   balking means,
   said balking means being adapted to prevent said drive pins from engaging said holes in said thick plate until said shaft has reached synchronized speed with said load end hub.

* * * * *